US005232019A

United States Patent [19]

Wolff et al.

[11] Patent Number: 5,232,019

[45] Date of Patent: Aug. 3, 1993

[54] FAUCET FOR BOTTLES OF COMPRESSED OR LIQUEFIED GAS

[75] Inventors: Fernand Wolff, Lintgen, Luxembourg; Zivko Paravigna, Labergement Foigney, France

[73] Assignee: Luxembourg Patent Company S.A., Luxembourg

[21] Appl. No.: 821,119

[22] Filed: Jan. 15, 1992

[30] Foreign Application Priority Data

Jan. 16, 1991 [FR] France ................................ 91 00449

[51] Int. Cl.[5] ................................................ F16K 21/00

[52] U.S. Cl. .................................. 137/614.2; 137/613; 141/95

[58] Field of Search ............ 137/613, 594, 881, 614.2; 141/95, 192

[56] References Cited

U.S. PATENT DOCUMENTS

| | | | |
|---|---|---|---|
| 3,885,589 | 5/1975 | Iung | 137/613 |
| 4,763,690 | 8/1988 | Martin | 137/613 |
| 4,844,111 | 7/1989 | Pritchard et al. | 137/882 X |
| 5,127,436 | 7/1992 | Campion et al. | 137/614.2 X |

FOREIGN PATENT DOCUMENTS

| | | |
|---|---|---|
| 870053 | 3/1953 | Fed. Rep. of Germany . |
| 9005826.7 | 9/1990 | Fed. Rep. of Germany . |
| WO89/02047 | 3/1989 | PCT Int'l Appl. . |

*Primary Examiner*—Martin P. Schwadron
*Assistant Examiner*—Kevin L. Lee
*Attorney, Agent, or Firm*—Leydig, Voit & Mayer

[57] ABSTRACT

The faucet comprises a closure member (64) between a gas-outlet passage (60) and an intake passage (62), an outer operator connected to the closure member (64) in order to displace the latter between an open position and a closed position, and a pressure reducer (66) for controlling the pressure at which the gas flows out in the open position of the closure member (64).

In order to enable the bottle to be filled, and the gas to be drawn off through the same aperture, a duct (76) is provided, branched between the intake passage (62) and the outlet passage (60), short-circuiting the pressure reducer (66) and provided with a non-return valve (70) the filling gas to flow from the outlet passage (60) to the intake passage (62) and preventing gas from flowing in the opposite direction.

6 Claims, 2 Drawing Sheets

Fig. 3
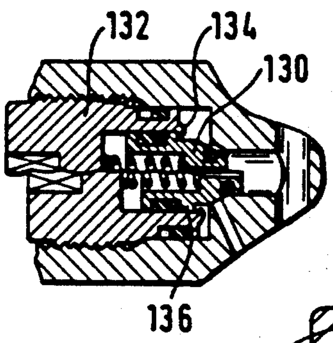
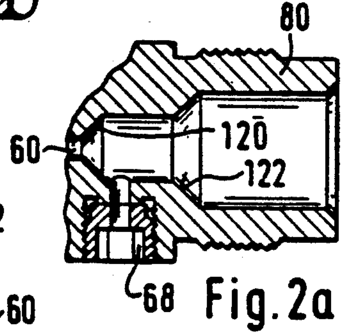
Fig. 2a
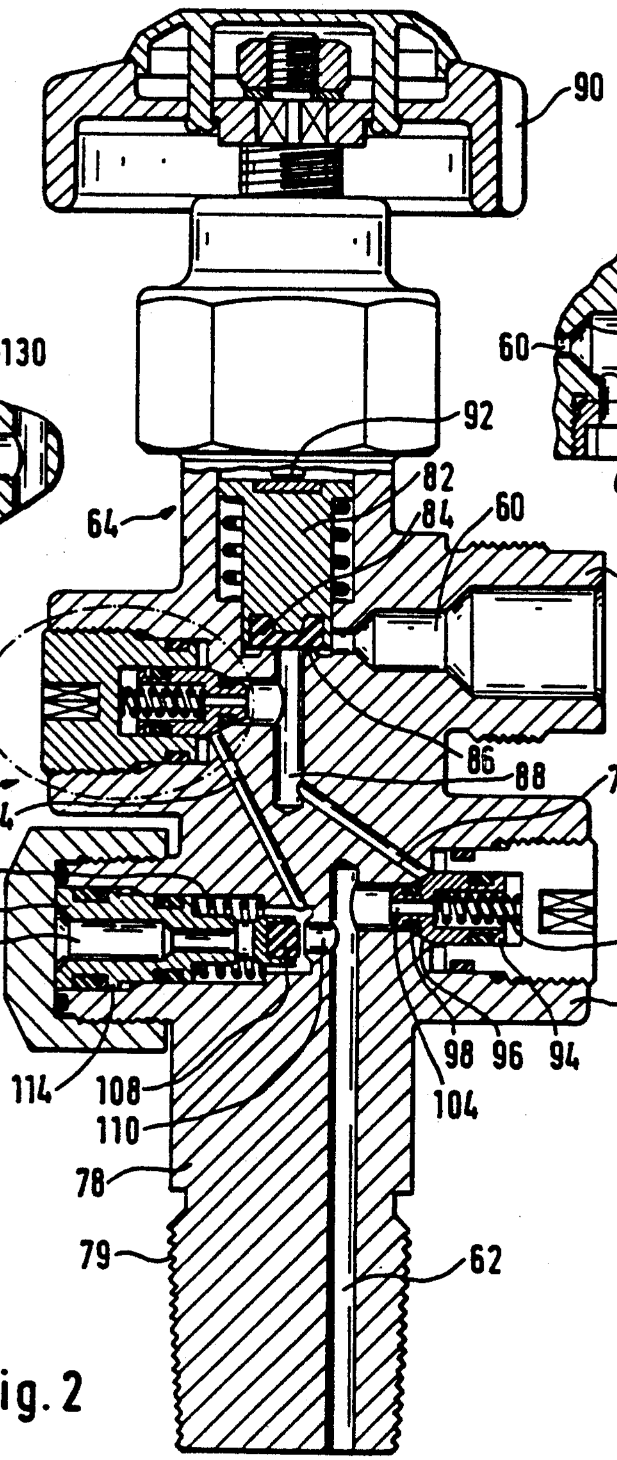
Fig. 2

FAUCET FOR BOTTLES OF COMPRESSED OR LIQUEFIED GAS

The present invention relates to a faucet for bottles of compressed or liquefied gas, comprising a body designed to be screwed onto a gas bottle, an inner closure member with a sealing surface at the intersection of a gas-outlet passage and a channel communicating with an intake passage, an outer operating means connected, through the body, to said closure member in order to displace the latter, counter to the action of elastic means, between an open position and a closed position, and a pressure reducer for controlling the pressure at which the gas flows out in the open position of the closure member.

Although not limited thereto, the subject of the invention is more particularly a faucet with a pressure reducer ensuring a prior reduction in the pressure of the gas so that there is no need, when filling a bottle, to have to take into account the use pressure or the performance of the pressure reducers provided in the use circuits. This makes it possible, in particular, to compress further the gas in the bottle during the filling, in other words to increase its contents, i.e. the quantity of gas, for the same capacity of the bottle, or to reduce the size of the bottle for the same contents.

Unfortunately, putting pressure reducers directly on bottles usually necessitates their removal with a view to filling the bottle, since the filling cannot take place through a pressure reducer, the latter allowing the gas to circulate in only one direction.

In order to overcome this, U.S. Pat. No. 4,844,111 proposes a pressure reducer which is provided with a second orifice serving only for the filling of the bottle and communicating directly with the inside of the latter. This pressure reducer has the disadvantage that, when filling the bottle, the orifice for drawing off the gas must be closed off and, vice versa, the filling orifice must be closed off during the drawing-off.

Faucets have also already been proposed with neutralizable pressure reducers, comprising relatively complicated means for neutralizing the action of the pressure reducer by locking the latter in a non-operable position during the filling of the bottle.

The object of the present invention is to provide a novel faucet of the type described in the introduction which enables the bottle to be filled, and the gas to be drawn off, through the same aperture.

In order to achieve this objective, the faucet proposed by the present invention essentially comprises a duct branched, through the body of the faucet, between the intake passage and the channel, short-circuiting the pressure reducer and provided with means enabling the filling gas to flow from the outlet passage to the intake passage and preventing gas from flowing in the opposite direction.

Said means preferably consist of a non-return valve. Another non-return valve is provided between the pressure reducer and the closure member. This non-return valve enables the gas to be drawn off through the pressure reducer but prevents the gas from penetrating into the pressure reducer during filling. This non-return valve normally does not allow the gas bottle to be emptied beyond a lower pressure threshold corresponding to the closure pressure of the non-return valve. Nevertheless, in order to be able to offer, when necessary, the possibility of completely emptying the bottle, for example by connecting it up to a vacuum pump, the non-return valve can preferably be neutralized from outside via mechanical or magnetic means.

The faucet also comprises a safety valve, known per se. The latter is preferably provided in a socket traversed by the outlet passage at a location in such a way that it is masked by a first connector which can be fitted to the socket in order to fill the bottle, but that it is not masked by a second connector which can be fitted to the same socket in order to draw off the gas.

Other features and characteristics of the invention will become apparent from the detailed description of an advantageous embodiment given below, by way of illustration, with reference to the attached figures, in which:

FIG. 2 shows an axial section through an embodiment of a faucet operating by the principle in FIG. 1, FIG. 2*a* shows the position of the safety valve, and FIG. 3 shows the details of a preferred embodiment of a non-return valve.

Figure 1:
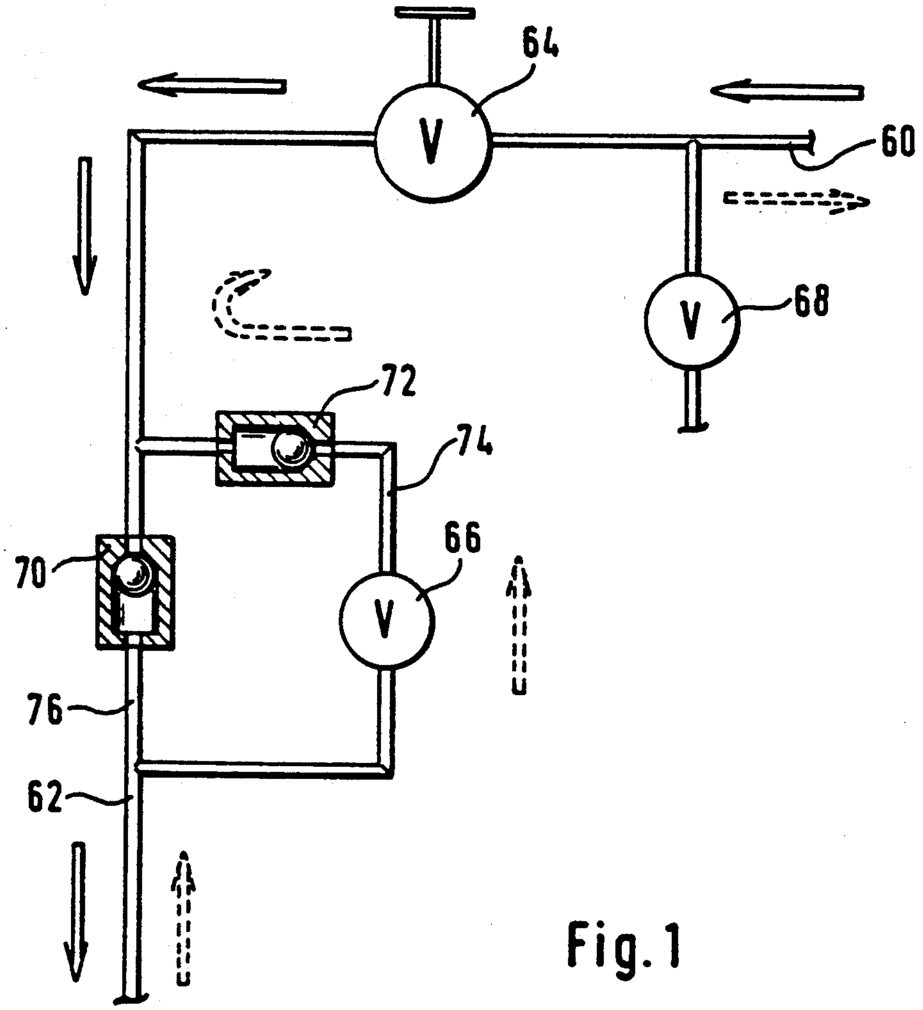
FIG. 1 shows a block diagram of the two operating modes of a faucet according to the present invention.

The operating principle of the faucet according to the present invention is first to be explained with reference to the block diagram in, FIG. 1 The active elements of the faucet are arranged between an outlet 60 of the faucet and an intake passage 62 communicating with the inside of a gas bottle, not shown. The reference 64 designates the closure member of the faucet, whilst the reference 66 designates a pressure reducer, known per se, designed for example to reduce the pressure of the gas from the filling pressure, in this case for example of the order of $300\times10^5$ Pa, of the bottle to the pressure, for example of the order of 90 to $120\times10^5$ Pa, of a use circuit. The reference 68 designates a safety valve, known per se, designed in order to open in the event of an excess pressure, for example caused by faulty operation of the pressure reducer. The references 70 and 72 each designate a non-return valve.

The drawing off of the pressurized gas takes place under normal operation, in a manner known per se, via the line 74 in the direction of the arrows drawn in broken lines, through the pressure reducer 66 and the open closure member 64. The novelty lies in the line 76 comprising a branch duct short-circuiting the pressure reducer 66 and connecting the outlet 60 to the intake 62 through the closure member 64, bypassing the pressure reducer 66. This line 76, represented by arrows drawn in solid lines, consequently enables the bottle to be filled through the open closure member 64, the pressure of the filling gas permitting the opening of the non-return valve 70. On the other hand, the non-return valve 72 prevents the filling gas from circulating through the pressure reducer 66. The non-return valve 70, for its part, prevents the gas from following the line 76 during the drawing-off, and forces it to take the passage through the pressure reducer 66 and its non-return valve 72 which opens under the pressure of the gases of reduced pressure.

An advantageous embodiment of a faucet operating by the principle in FIG. 1 will now be described with reference to FIGS. 2 and 3. This faucet comprises a body 78, the lower part of which is provided with an external thread 79 enabling it to be screwed onto a gas bottle, not shown. The lower part of the body 78 is traversed by an intake duct 62 communicating with the inside of the bottle, whilst the upper part of the body 78 is provided with a radial outlet passage 60 through a socket 80 to which can be connected either a gas-use socket or a bottle-filling socket. The central part of the body 78 comprises radial housings for receiving the active elements illustrated in FIG. 1, namely the pressure reducer 66 and the non-return valves 70 and 72. The closure member 64 is located in the upper part of the body 78 of the faucet. This closure member 64 consists of a piston 82, the lower part of which comprises a sealing pellet 84 interacting with a seat 86 surrounding an axial channel 88. The outlet passage 60 communicates with the annular space surrounding the seat 86.

The upper part of the faucet comprises an operating wheel 90 acting, via a rod 92, on the piston 82. FIG. 2 shows the wheel 90 in the closed position in which the pellet 84 is applied in sealing fashion to its seat 86. When the operating wheel 90 is untightened, the piston 82 is raised under the action of an appropriate mechanical means such as a helical spring, thus lifting the pellet 84 off its seat 86 and establishing communication between the channel 88 and the outlet passage 60.

According to the principles in FIG. 1, the intake duct 62 can communicate with the channel 88 via the pressure reducer 66, the duct 74 and the non-return valve 72, whilst the channel 88 can also be brought into communication with the intake duct 62 via the branch duct 76 and the non-return valve 70.

In the example shown, the two non-return valves 70 and 72 are identical to each other. They essentially consist of a piston 94 sliding in a cylindrical axial housing of a plug 100 screwed into an appropriate socket of the body 78 of the faucet. The piston 94 has an inner tapered head provided with a seal 98 intended to interact with the corresponding seat 96 of the body of the faucet. The piston 94 is subjected to the influence of an inner calibrated spring 102, the action of which tends to maintain the piston 94 in sealing fashion on its seat 96. The piston 94 is, moreover, pierced axially at 104 so as to balance the pressure on either side of the piston 94.

The pressure reducer 66 comprises, in a manner known per se, a piston 106 mounted radially in a cylindrical bore of the body 78 with a seal 108 capable of closing off a radial passage 110 between the housing of the piston 106 and the intake duct 62. The piston 106 is subjected, in the direction of its opening, to the action of a spring 112 which is calibrated so as to ensure a specified degree of pressure reduction. The cross section of the inner side of the piston 106 is slightly smaller than the cross section of the outer side owing to a peripheral shoulder 114 and a corresponding widening of the bore in which the piston 106 slides. This piston 106 is provided with an axial channel 116 establishing communication between its two opposite faces.

The faucet is also provided with a safety valve 68 which, in the embodiment illustrated, is provided in the socket 80 (see FIG. 2*a*). This safety valve consists, in a manner known per se, of a diaphragm which can burst when the pressure of the gas supplied to the use network exceeds a predetermined safety threshold, for example in the event of faulty operation of the pressure reducer 66, and this takes place in order to release the gas and to prevent the bottle from exploding. The safety valve 68 is preferably provided in a cylindrical section of the socket 80 between two successive conical shoulders or seats 120 and 122.

The operation of the faucet for the two operating modes explained with reference to FIG. 1 will now be described. With a view to filling a bottle with a gas under high pressure, for example $300\times10^5$ Pa, there is screwed onto the socket 80 a connector (not shown) provided with a seal which, when the connector is screwed onto the socket 80, lies in sealing fashion on the inner seat 120. This prevents the safety valve 68 from being exposed to the filling gas under high pressure, at which its diaphragm would burst. After the operating wheel 90 has been opened, the pressurized gas flows into the axial channel 88 and the branched duct 76. The pressure of the gas is exerted on the head of the piston 94 of the non-return valve 72 but, because of the axial aperture 104 in the piston, the pressure is balanced on either side of the piston and, because of the greater cross section on the spring 102 side, the differential pressure of the gas on the piston 94 maintains the non-return valve 72 in the closed position. The non-return valve 72 consequently performs its non-return function during the filling. Although it would be impossible for the pressurized gas to traverse the pressure reducer 66 by passing through the duct 74 given that the passage through a pressure reducer is always one-way, the non-return valve 72 prevents the high pressure of the filling gas from being exerted on the pressure reducer and causing its seal 108 to become worn rapidly owing to the high force which applies it to its seat.

In the non-return valve 70, the pressure of the gas is exerted on the peripheral region of the neck 96 of the piston 94, and lifts the latter off its seat counter to the action of the spring 102 so that the pressurized gas can flow freely through the open non-return valve 70 of the passage 62 to the inside of the bottle.

As soon as the filling pressure falls, for example once the operating wheel 90 has been closed, below the pressure exerted by the spring 102 on the non-return valve 70, the latter closes automatically. An appropriate calibration of the spring 102 enables this closure threshold of the non-return valve 70 to be fixed at a specified pressure, for example of the order of $4\times10^5$ Pa.

In order to connect the bottle to a use circuit, there is screwed onto the socket 80 a connector (not shown) provided with a seal which, this time, is applied in sealing fashion to the seat 122 of the socket 80 or to the entrance of the socket 80 in such a way that the safety valve 68 is subjected to the action of the gas of reduced pressure leaving the faucet and can perform its function in the event of abnormal excess pressure.

When drawing off gas, the non-return valve 70 operates in the same way as the non-return valve 72 during the filling, that is to say the high pressure of the gas is exerted, by virtue of the passage 104 of the piston 94, on both sides of the latter and maintains it in the closed position, thus forcing the pressurized gas to traverse the pressure reducer 66.

Given that the high pressure of the gas leaving the bottle is exerted on either side of the piston 106 of the pressure reducer 66, and that the external cross section of the latter is greater than its internal cross section, the gas exerts a differential pressure on the piston 106 in the direction closing it. The position of equilibrium resulting from the action of this differential pressure and from the thrust of the spring 112 thus determines the degree of pressure reduction of the gas, which is determined by an appropriate calibration of the spring 112, generally of the order of 90 to $120\times10^5$ Pa. The gas whose pressure has been reduced to this level flows through the duct 74 in order to open the non-return valve 72 in the same way as the non-return valve 70 opens under the action of the pressure of the filling gas. The gas of reduced pressure can consequently flow through the open non-return valve 72 into the use circuit, as long as the closure member 64 is open.

When the pressure in the gas bottle falls below the reduced pressure at which the pressure reducer 66 is set, the latter ceases to have any effect under the action of its spring 112 which maintains it in the open position so that the gas, no longer requiring to have its pressure reduced, can flow freely through the duct 74 and the open non-return valve 72.

When the pressure in the gas bottle falls to a value corresponding to the force exerted by the spring of the non-return valve 72, the pressure of the gas is no longer able to maintain the non-return valve open, with the result that the latter closes under the action of its spring and stops the flow of the gas to the use circuit. This minimal pressure, which depends upon the calibration of the spring of the non-return valve 72, can be of the order of 1.5 to $2\times10^5$ Pa. In other words, the non-return valve 72, in addition to its intrinsic functions of enabling the gas to flow in only one direction, prevents the gas bottle from being emptied completely beyond a residual pressure corresponding to the value of the calibration of its spring. Maintaining such a minimal gas pressure in the bottle has the advantage of preventing impurities and moisture from penetrating into the bottle before it is filled again, even when the main closure member 64 has been accidentally left open.

Although it is useful to be able to preserve a residual pressure in the bottle in order to prevent impurities from penetrating, it may occasionally be necessary to empty it completely by connecting it up to a vacuum pump, in particular with a view to rinsing. For this purpose, it is useful to provide means for being able to neutralize the action of one of the two non-return valves 70, 72. FIG. 3 shows again, by way of an alternative, the circled portion in FIG. 2 and depicts an illustrative embodiment of a neutralizable non-return valve. In this embodiment, the piston 130 which forms the shut-off member is mounted so as to slide in the cylindrical housing of a plug 132 which is screwed into the body 78 of the faucet. The housing of the shut-off member 130 comprises an inner retaining edge 134 interacting with a peripheral shoulder 136 of the shut-off member 130. When the plug is screwed as far as it will go into the body 78 of the faucet, as represented in the lower part of FIG. 3, the freedom of movement of the member 130 is not inhibited by this peripheral edge 134. On the other hand, when the plug 132 is unscrewed, as represented in the upper part of FIG. 3, the member 130 is lifted off its seat under the effect of the action of the edge 134 on the shoulder 136. By unscrewing the plug 132 further, the member 130 is completely freed from its seat and the non-return valve is this neutralized in an open position, which enables the bottle to be emptied completely and, if necessary, to be connected up to a vacuum pump.

It is possible to provide means for neutralizing the non-return valve other than those which have been shown in FIG. 3. For example, it is possible to equip the shut-off member 130 with a rod traversing the plug axially and in sealing fashion and capable of being actuated externally by mechanical or magnetic means in order to lift the member 130 off its seat counter to the action of its spring.

Instead of neutralizing the non-return valve 72, the non-return valve 70 could, in principle, be made neutralizable. It is, however, preferable to neutralize the non-return valve 72 given that it is situated downstream of the pressure reducer 66 and is not, like the non-return valve 70, subjected to the high pressure of the gas in the bottle, and this makes it possible to deal with any eventuality of negligence or of forgetting to reactivate the non-return valve after it has been neutralized.

One final point to be stressed is that, although a faucet such as that illustrated in FIG. 2, in other words with the pressure reducer provided beneath the non-return valve 72, and the non-return valve 70 beneath the socket 80, is a practical embodiment, this arrangement has been chosen for the purposes of the description and to give the figure clarity. In practice, in order to make the faucet more compact, in particular axially, the pressure reducer 66 and the non-return valve 70 are provided approximately at the level of the non-return valve 72 and of the socket 80, and are arranged in a cross-shape with respect to the latter elements.

We claim:

1. A faucet for bottles of compressed or liquefied gas, comprising a body (78) designed (64) with a sealing surface at the intersection of a gas-outlet passage (60) and a channel (88) communicating with an intake passage (62), an outer operating means (90) connected, through the body, to said closure member (64) in order to displace the latter, counter to the action of mechanical or elastic means (94), between an open position and a closed position, and a pressure reducer (66) for controlling the pressure at which the gas flows out to the outlet passage (60) in the open position of the closure member (64), a first duct (74) extending within said body (78) between the intake passage (62) and the channel (88), said pressure reducer (66) being in said first duct, first means enabling gas to flow from said intake passage (62), through said pressure reducer (66) and to said channel (88) and preventing gas from flowing through said pressure reducer (66) in the opposite direction, a second duct (76) extending within said body (78) between the intake passage (62) and the channel (88), said second duct (76) bypassing the pressure reducer (66) and being provided with means enabling filling gas to flow from the outlet passage (60) to the intake passage (62) and preventing gas from flowing form the intake passage (62) to the outlet passage (60), there being a socket (80) communicating with the outlet passage (60) and having first and second spaced frustoconical shoulders (120, 122), said socket (80) having a safety valve (68) communicating with said outlet passage (60) at a location between said frustoconical shoulders (120, 122) in such a way that the safety valve is masked by a first connector which can be fitted to the socket (80) and against said first frustoconical shoulder (120) in order to fill the bottle but is not masked by a second connector which can be fitted to the same socket (80) and against said second frustoconical shoulder (122) in order to draw off the gas from the bottle.

2. The faucet as claimed in claim 1, wherein said second means comprise a non-return valve (70).

3. The faucet as claimed in claim 2, in which said first means comprises a non-return valve (72) between the pressure reducer (66) and the closure member (64).

4. The faucet as claimed in claim 3, wherein the non-return valve (72) can be neutralized from outside.

5. The faucet as claimed in claim 4, wherein the non-return valve (72) comprises a shut-off member (130) which is subjected to the action of a spring and mounted inside a plug (132) screwed into a socket of the body of the faucet and the unscrewing of which frees the passage in both directions through the non-return valve.

6. The faucet as claimed in claim 5, wherein the plug comprises a cylindrical housing for the shut-off member, and wherein the housing is provided with an inner edge (134) interacting with a peripheral shoulder (136) of the shut-off member.

* * * * *